(12) United States Patent
Erban

(10) Patent No.: US 6,584,398 B1
(45) Date of Patent: Jun. 24, 2003

(54) METHOD AND DEVICE FOR EXERCISING A DIFFERENTIAL BLOCKING FUNCTION FOR A VEHICLE

(75) Inventor: Andreas Erban, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/857,872

(22) PCT Filed: Oct. 11, 2000

(86) PCT No.: PCT/DE00/03567

§ 371 (c)(1),
(2), (4) Date: Sep. 10, 2001

(87) PCT Pub. No.: WO01/26925

PCT Pub. Date: Apr. 19, 2001

(30) Foreign Application Priority Data

Oct. 12, 1999 (DE) ........................................... 199 49 270

(51) Int. Cl.[7] ............................................. B60K 28/16
(52) U.S. Cl. ...................... 701/82; 180/244; 180/248; 180/197; 303/139
(58) Field of Search ..................... 701/82, 89; 180/244, 180/248, 249, 197; 303/139

(56) References Cited

U.S. PATENT DOCUMENTS

| 4,263,824 A | * | 4/1981 | Mueller | 475/86 |
| 4,671,373 A | * | 6/1987 | Sigl | 180/197 |
| 4,681,185 A | * | 7/1987 | Hoernig et al. | 180/247 |
| 4,841,809 A | * | 6/1989 | Jolly | 475/163 |
| 5,029,491 A | * | 7/1991 | Carden | 74/650 |
| 5,531,653 A | * | 7/1996 | Barnholt | 475/234 |
| 5,677,840 A | * | 10/1997 | Futawatari | 180/197 |
| 5,742,917 A | * | 4/1998 | Matsuno | 180/197 |
| 5,913,949 A | * | 6/1999 | Valasopoulos | 74/650 |
| 5,927,425 A | * | 7/1999 | Kusano | 180/248 |

FOREIGN PATENT DOCUMENTS

| DE | 34 21 776 | 12/1984 |
| DE | 44 18 773 | 1/1996 |
| DE | 198 04 716 | 8/1998 |

OTHER PUBLICATIONS

Zanten et al., *FDR—Die Fahrdynamik* . . . , Stuttgart, Germany, vol. 96, No. 11, Nov. 1, 1994 pp. 674–678 and 683–688.

* cited by examiner

Primary Examiner—William A. Cuchlinski, Jr.
Assistant Examiner—Olga Hernandez
(74) Attorney, Agent, or Firm—Kenyon & Kenyon

(57) ABSTRACT

A method for implementing a differential lock function for a vehicle. The vehicle is an all-wheel drive vehicle, and the differential lock function produces an interaxle lock acting between the front axle and the rear axle of the all-wheel drive vehicle. In response to incipient slippage of at least one driven wheel, the method implements the function of a differential lock, using actions carried out independently of the driver, on at least one arrangement for controlling the wheel torque. In this context, at least one setpoint value for a wheel torque to be set is selected for carrying out the actions executed independently of the driver.

18 Claims, 3 Drawing Sheets

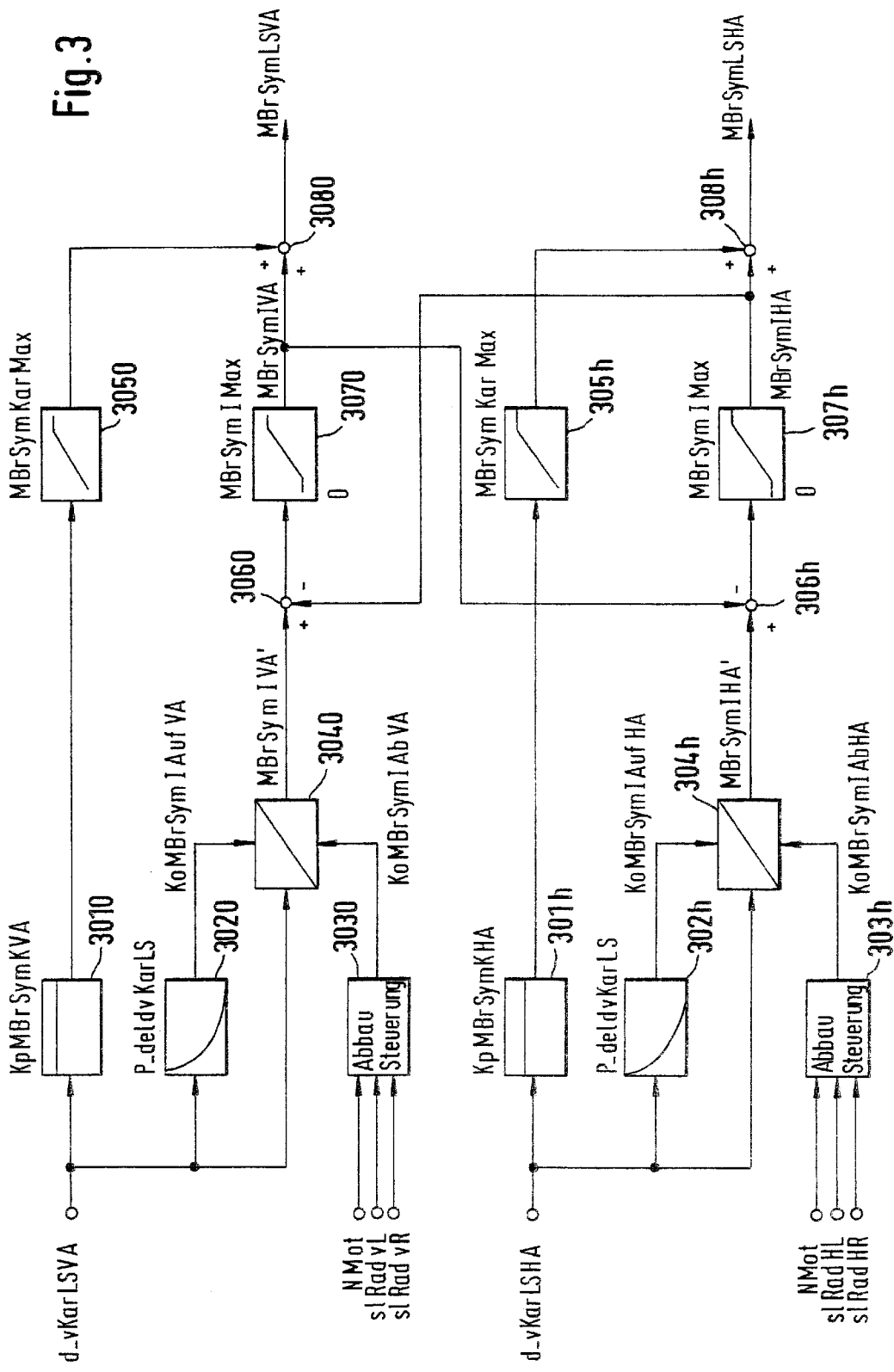

METHOD AND DEVICE FOR EXERCISING A DIFFERENTIAL BLOCKING FUNCTION FOR A VEHICLE

FIELD OF THE INVENTION

The present invention relates to a method and device for implementing a differential lock function for a vehicle.

BACKGROUND INFORMATION

The production or implementation of a differential lock function, especially the implementation of an interaxle lock function, by actively decelerating wheels having a drive slip that is too high, is known from the related art. In known methods heretofore, an interaxle lock function is usually produced or implemented by using so-called individual control systems. In this context, the individual wheel control system simultaneously assumes the locking function in the transverse direction, and in the longitudinal direction.

German Published Patent Application No. 34 21 776 describes a vehicle having all-wheel drive. In this vehicle, not only are the wheels of one axle connected to the drive shaft, but also the drive shafts are connected to the driving motor via a differential gear. The object of German Published Patent Application No. 34 21 776 is to provide an electronic alternative for the differential locks. The electronic differential locking is implemented by supplying braking pressure to the individual wheel brakes in response to the occurrence of drive slip. That is, one or more wheels are decelerated when this wheel or these wheels undergoes or undergo wheelslip in comparison to the other wheels. When the last wheel slips as well, then the engine torque is reduced. In other words, all of the wheels are adjusted to an optimum drive slip, and therefore allow good lateral grip.

With regard to the implementation of the differential lock function, one can only deduce the supply of braking pressure from German Published Patent Application No. 34 21 776. The use or provision of a specific requirement regarding the level of the braking pressure to be supplied cannot be gathered from this document. Consequently, one can also not infer from it that, within the framework of implementing the differential lock, a braking moment is set in accordance with a preselected setpoint value. Therefore, the actions carried out in this manner do not ensure that the speeds of the driven vehicle axles approach each other in a desired manner.

Therefore, the object of the present invention consists in improving existing methods and devices for implementing a differential lock function.

SUMMARY OF THE INVENTION

The method of the present invention is a method for implementing a differential lock function for a vehicle. In response to incipient slippage of at least one driven wheel the method of the present invention implements the function of a differential lock, using actions carried out independently of the driver, on at least one arrangement for controlling the wheel torque. The implemented differential lock function should preferably be a differential lock acting between the front axle and the rear axle of the vehicle. At least one setpoint value for a wheel torque to be set is selected for carrying out the actions executed independently of the driver.

The vehicle is advantageously a vehicle having all-wheel drive. Therefore, the differential lock function is an interaxle lock acting between the front axle and the rear axle of the vehicle. However, this should not represent a limitation. The present invention's method for implementing an interaxle lock function, which is represented for an all-wheel drive vehicle in the exemplary embodiment, can also be appropriately modified for use in a vehicle having a single driven axle, in order to implement an axle differential locking function. However, this use shall not be discussed in any more detail within the framework of the present application.

The selection of the at least one setpoint value—there are two driven axles in a vehicle having all-wheel drive, which is why two setpoint values are selected—allows the speeds of the driven vehicle axles to approach each other. This measure assures optimum traction for the vehicle.

The arrangement for controlling the wheel torque is advantageously a brake actuator, which is assigned to a wheel of the vehicle, and is a part of a braking system that can generate braking torques at individual vehicle wheels, independently of the driver. On the other hand, the braking system can be a hydraulic, electrohydraulic, pneumatic, electropneumatic, or electromechanical braking system. A controllable mechanical locking device or a controllable clutch can be used as an alternative to the brake actuator.

Such a controllable mechanical locking device or controllable mechanical clutch could be used to bypass an open, center differential, or to directly couple the second drive axle to the main drive axle, as would be possible in the case of a front-wheel drive vehicle having a coupleable rear-wheel drive. In this case, the coupling torque to be transmitted, which results from the equation $|MBrSymLSVA-MBrSymLSHA|$, would be used as a setpoint value. This setpoint value is input via a torque interface to the secondary controller, as a setpoint value for the coupling torque.

If the arrangement for controlling the wheel torque is a brake actuator, then a setpoint value for a wheel-brake torque is advantageously selected as a setpoint value. In the case of a vehicle, which has all-wheel drive, and consequently has two driven axles, a setpoint value is selected for each of the two axles.

A setpoint value for the Cardanic speed of an axle is ascertained as a function of first wheel speed variables that describe the free-rolling wheel speeds, and as a function of a setpoint value for the drive slip. An actual value for the Cardanic speed of the same axle is ascertained as a function of second wheel speed variables, which describe the wheel speeds ascertained with the aid of wheel speed sensors. A deviation variable is determined as a function of this setpoint value and this actual value. Using a controlling arrangement, in particular a PI controller, this deviation variable is converted into the setpoint value for a wheel torque to be set.

The setpoint value for the Cardanic speed is selected in such a manner, that the differential lock function is activated as a function of time, prior to controlling the engine torque. To this end, the setpoint value for the Cardanic speed is especially ascertained as a function of a speed variable, which describes the vehicle speed. This procedure is based on the following: Measures are initially taken in the starting range, in order to improve the traction by locking action. As long as this potential is not exhausted, the engine torque is only reduced slightly. The drive torque is only reduced sharply, when all four wheels have too much drive slip, or the vehicle becomes unstable. This is accomplished by interventions in the engine-torque control.

Effects in the second wheel speed variables, which originate from reciprocal oscillations of the wheel speeds at the respective axle, are considered in the determination of the deviation variable.

It is advantageous, when the controlling arrangement has a proportional component and an integral component. The integration gain for the integration component is ascertained as a function of the value of the differentiated deviation variable. The integral component is reduced quickly, when at least one wheelslip variable for the respective axle exceeds a predetermined value. The wheelslip is monitored for the following reason: Because of the active build-up of braking pressure at the drive wheel, it can never be ruled out that this wheel is being overly decelerated. This results in brake slip at the overly decelerated wheel, which is to be immediately eliminated by reducing the pressure.

In the case of all-wheel drive vehicles, optimum traction can only be achieved when all of the driving wheels are rotating at speeds that are as uniform as possible. In particular, no differential speed, or as small a differential speed as possible, should occur between front axle (VA) and rear axle (HA), in order that the engine torque can be optimally transmitted through the wheels, to the ground. This requirement can be met with the aid of the method and device according to the present invention.

The function of a differential lock in the longitudinal direction, i.e. between the front axle and the rear axle of the vehicle, should be realized by an independent control loop. In this manner, the resulting interaxle locking effect can be controlled individually. This should be achieved by a wheel speed controller based on setpoint slip values.

For this purpose, the vehicle is advantageously equipped with a slip control device, as is known, e.g. from the article "FDR—Die Fahrdynamikregelung von Bosch" ("ESP—The Electronic Stability Program of Bosch") published in the Automobiltechnischen Zeitschrift (Automobile Technology Magazine) (ATZ) 96, 1994, issue 11, pages 674 through 689. In addition, at least one vehicle motion variable can be controlled by this device. This vehicle motion variable is the yaw velocity of the vehicle. To control the yaw velocity of the vehicle, the measured yaw velocity is compared to a setpoint value for the yaw velocity, and the yaw velocity deviation is ascertained, as a function of which wheel-specific braking actions and/or engine interventions are carried out independently of the driver. To this end, setpoint slip changes are determined as a function of the yaw velocity deviation, and the setpoint slip values for the individual wheels are ascertained from the setpoint slip changes. These setpoint slip values are supplied to controllers, which are subordinate to the yaw velocity controller, and by way of which the brake slip or the drive slip can be controlled. In order to set a wheel speed, the setpoint slip value is specially converted to a setpoint wheel speed in the subordinate controller that controls the drive slip. Above all, the wheel-specific braking actions that are independent of the driver apply a yaw torque to the vehicle, by way of which the actual yaw velocity of the vehicle approaches the setpoint value for the yaw velocity.

In the meantime, the above-described operating dynamics control system is now widely referred to as ESP (Electronic Stability Program). As a result, the content of the publication "ESP—The Electronic Stability Program of Bosch" shall be a part of this application.

The above reference to the device for controlling operating dynamics should not represent a limitation. Of course, the vehicle can also be equipped with a device for controlling drive slip, or with another device for controlling slip. However, the device for controlling slip executes wheel-specific braking actions, so-called active braking actions, independently of the driver, since these implement the method of the present invention.

The interaxle lock controller (L-controller) of the present invention is advantageously realized in such a manner, that it can be integrated into an existing electronic stability program for any all-wheel drive vehicle. The following measures ensure that the interaxle lock controller can be easily integrated: Only input variables based on physical quantities are used for the interaxle lock controller. The two torques MBrSymLSVA and MBrSymLSHA are used as output variables for the case, in which the arrangement for controlling the wheel torque are brake actuators. However, the coupling torque |MBrSymLSVA—MBrSymLSHA| is used in the case, in which the arrangement for controlling the wheel torque is a controllable locking device or a controllable clutch. Any actuator functioning on the basis of torque, whether it is a controllable coupling or a controllable locking device, can be rapidly coupled to the interaxle lock controller. If this is not possible, a special interface is provided. Such an interface may be a characteristics map for the coupling-actuator control current as a function of the coupling torque.

Furthermore, the interaxle lock controller of the present invention is realized in such a manner, that it functions in harmony with an engine torque control system (AMR), if necessary. In addition, it satisfies offroad requirements, i.e. it can be used in vehicles traveling on a rough road surface, or used for traveling offroad. The following measures are taken for this: The maximum interaxle lock torque (MBrSymIMax) becomes larger with increasing control period. Above certain, high engine torques, the reductions in engine torque becoming increasingly weak. In difficult offroad terrain, there is almost no more engine torque reduction. The engine torque is more distinctly reduced on low coefficients of friction, which allows one to start smoothly from rest.

Additional advantages include:

The Cardanic speeds of each axle are synchronized. For dynamic reasons (vibration damping), it is advantageous when each axle can be controlled individually. This is in close conjunction with the specific embodiment as a brake-interaxle lock.

The interaxle lock torque is built up using a PI controller, since a system deviation exists in the case in which the interaxle lock has to increase the locking torque. Whereas the interaxle lock torque is reduced with the aid of a control system. In this case, there is no deviation that can be evaluated.

Geometric slip, which can possibly occur from cornering, is calculated. Assuming that cornering and the associated geometric slip could possibly occur, this measure ensures that no actions are carried out that are not really necessary. For example, the so-called geometric slip occurs during cornering, since the front wheels are turning at a smaller radius than the corresponding rear wheels. In the absence of compensating measures, a system deviation would occur which would activate the interaxle lock in response to tight cornering. This effect is calculated by taking the kinematic interrelationships into account. It is already taken into consideration during the determination of the free-rolling wheel speeds. The dead zone of the interaxle lock controller would have to be expanded, if the geometric slip were not compensated for.

A setpoint torque is output axle-specifically, as an actuating variable, to a secondary actuator. The actuator can be a braking system, which can actively build up pressure, i.e. independently of the driver. A controllable, mechanical locking device or a controllable mechanical coupling, which acts between the front axle and the rear axle, can also be considered as an actuator. However, the actuator in the latter case must be supplied an actuating variable, which represents the difference to be set in the setpoint torque between the front axle and the rear axle. The coupling torque |MBrSymLSVA—MBrSymLSHA| is suited for this.

The dynamics of the interaxle lock controller can be adjusted independently of the axle differential locks. This is achieved by using an independent controller having its own set of parameters, in order to implement the interaxle lock function. At the same time, the working point can be individually adjusted in a manner enabling a harmonious interaction with an engine-torque control system.

When needed, stall protection for vehicles having a manual transmission prevents the engine from stalling, which can possibly be triggered by activities of the interaxle lock controller. The stall protection relates to the following issue: The actions of the present invention on the arrangement for controlling the wheel torque can decelerate the wheels so sharply, that it is possible for the vehicle engine to stop. Appropriate monitoring is used to prevent this.

The stall protection is implemented as follows: The engine speed is monitored. If it falls below a specific minimum value, then the interaxle lock torque is sharply reduced in response thereto, until the engine speed has exceeded this minimum value again. The minimum value for the engine speed can be selected as a function of the interaxle lock torque itself, using a characteristic curve. It is also ensured that the interaxle lock torque is limited to a percentage of the instantaneously available, Cardanic drive torque.

BRIEF DESCRIPTION OF THE DRAWINGS

FIG. 3 shows a third block diagram of the present invention.

DETAILED DESCRIPTION

The content of the above-mentioned ATZ article "ESP—The Electronic Stability Program of Bosch" shall herewith be incorporated into the specification, and shall be a part of the specification. The same shall apply for the content of German Published Patent Application No. 34 21 776.

The exemplary embodiment forming the basis of the present application describes the use of a braking system, which provides for the option of actively building up pressure, i.e. independently of the driver. This should not represent a limitation. In a corresponding manner, the interaxle lock function can also be implemented with the aid of a controllable interaxle lock or an appropriately installed clutch.

Figure 1:
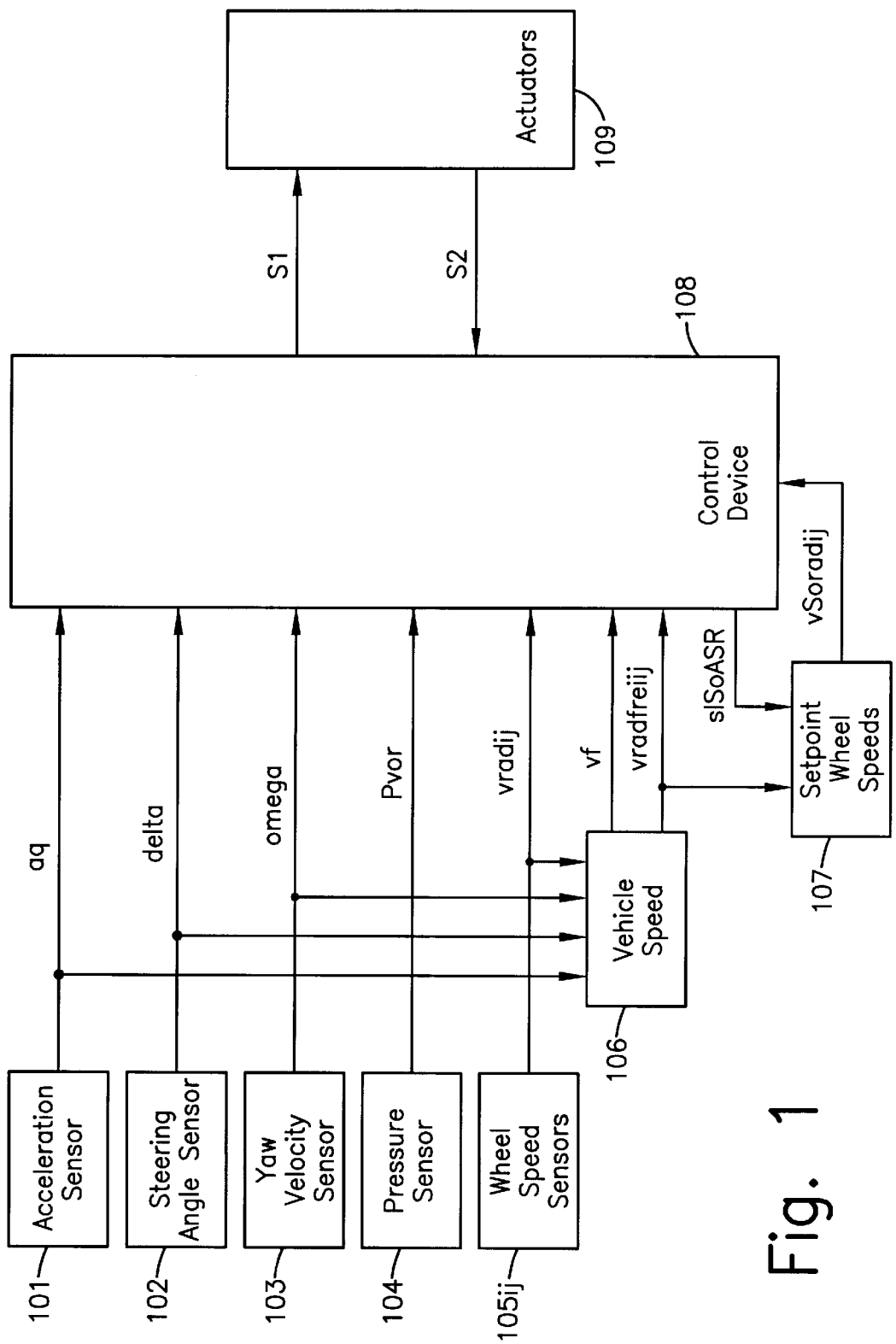
FIG. 1 shows a first block diagram of the present invention.

A control device 108 is represented in general form in FIG. 1. This control device is, for example, a control device that is used within the framework of an electronic stability program. For further details, one can refer to the above-mentioned publication "ESP—The Electronic Stability Program of Bosch". The control device is fed various input variables: transverse acceleration aq detected by a transverse acceleration sensor 101, steering angle delta detected by a steering angle sensor 102, vehicle yaw velocity omega detected by a yaw velocity sensor 103, inlet pressure Pvor set by the driver and detected by a pressure sensor 104, as well as wheel speeds vradij detected by wheel speed sensors 105*ij*.

In addition, control device 108 is fed a speed variable vf, as well as free-rolling wheel speeds vradfreiij. The free-rolling wheel speeds are ascertained in a block 106, using wheel speed variables vradij as a starting point, and considering the vehicle motion, which is described by the transverse acceleration, the yaw velocity, and the steering angle. The free-rolling wheel speeds ascertained in this manner do not have any more speed components, which originate from the vehicle motion. This measure eliminates existing geometric slip. Speed variable vf, which describes the speed of the vehicle, is ascertained in block 106 in a known manner, as a function of free-rolling wheel speeds vradfreiij. The free-rolling wheel speeds are later referred to as first wheel speed variables, as well. Wheel speeds vradij detected by wheel speed sensors 105*ij* are also referred to later as second wheel speed variables.

Free-rolling wheel speeds vradfreiij are also fed to a block 107. In addition, a variable s1SoASR describing the setpoint value of the drive slip is supplied to this block, by block 108. From these variables, variables vSoradij describing the setpoint wheel speeds are determined in block 107. For example, variables vSoradij are determined according to the equation $$vSoradij = vradfreiij * (1 + s1SoASR) \quad (1).$$

Variables vSoradij are fed to control unit 108 for further processing. Since the setpoint wheel speeds are ascertained as a function of the free-rolling wheel speeds, possibly existing geometric slip is eliminated in them as well.

The above-mentioned, abbreviated style of writing 105*ij* used for the wheel speed sensors has the following meaning: Subscript i indicates whether a front wheel (v) or a rear wheel (h) is being referred to. Subscript j indicates whether a right (r) or a left (l) vehicle wheel is being referred to. This style is the same for all of the variables or blocks, for which it is used.

Within the framework of the electronic stability program, the control device uses the variables supplied to control device 108, in accordance with the control concept stored in it, to generate control signals S1 for the actuators 109 assigned to it. Within the framework of the electronic stability program, the actuators may be arrangements for controlling the torque supplied by the engine, and/or brake actuators that are assigned to the wheels of the vehicle, and can be a part of a hydraulic, electrohydraulic, pneumatic, electropneumatic, or electromechanical braking system. Actuators 109 supply signals S2 to the control device, which give the control device information about the operating state of the actuators. Reference is made to the above-mentioned publication "ESP—The Electronic Stability Program of Bosch", regarding the control concept stored in control device 108.

The above-described control of the actuators relates to the control implemented within the framework of the electronic stability program. Furthermore, block 108 also generates the signals for carrying out the actions of the present invention. To this end, at least one setpoint value for a wheel torque to be set is generated in block 108. This setpoint value is converted into signals S1, by which an arrangement for controlling the wheel torque included in block 109 is controlled. As previously mentioned, this arrangement can include brake actuators, a controllable, mechanical locking device, or a controllable clutch.

In addition, an identification takes place in block 108, which determines whether or not there is a tendency for at least one driven wheel to experience wheelslip. To this end, the existing slip value for each of the driven wheels is evaluated in such a manner, that it is compared to a specifiable threshold value. If the threshold value for a driven wheel is exceeded, then this wheel has a tendency to experience wheelslip. This information is evaluated within the framework of the method according to the present invention. The differential lock function is only activated for the case, in which there is incipient slippage at at least one wheel.

If the differential lock function is an interaxle lock, then the interaxle lock is normally only activated, when the drive slip at both wheels of a drive axle is too high. For a single free-spinning wheel on an axle is normally stabilized by the axle differential lock at first, and is initially not evaluated by the interaxle lock. On the other hand, the situation in which the wheels of an axle are mutually unstable, i.e. so-called axle tramp, is evaluated by the interaxle lock.

As an alternative to the previously described evaluation of the wheelslip, the wheel speed can also be evaluated directly.

Of course, control device 108 can also be a control device, which is used within the framework of a traction control system. It can also be a different control device. However, for the case in which the interaxle lock function shall be implemented with the aid of braking actions, such a control device and such a braking system should be used, which enable driver-independent braking actions.

Figure 2:
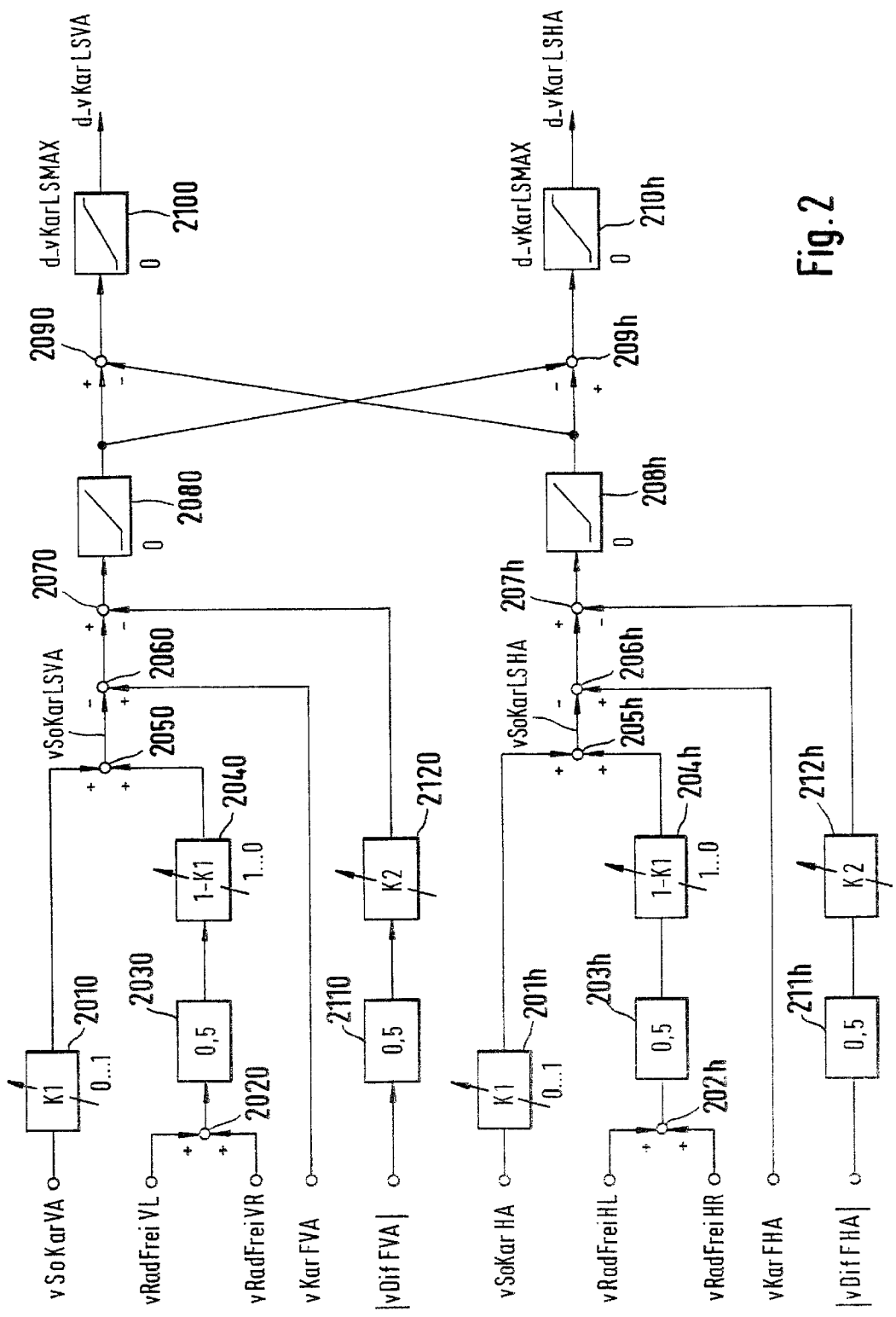
FIG. 2 shows a second block diagram of the present invention.

Before FIG. 2 is discussed in detail, the formation of different setpoint values and controlled variables forming the basis of the implementation of the interaxle lock function should be described. These variables are ascertained internally in block 108. The basis for ascertaining these variables is, on one hand, setpoint wheel speeds vSoradij determined according to equation (1), as well as wheel speed variables vradij ascertained by the wheel speed sensors.

The non-linearized values for the setpoint Cardanic speeds of the front axle (VA) and the rear axle (HA) are determined as follows:

$$vSoKarVA = (vSoradvl + vSoradvr)/2 \qquad (2a); \text{ and}$$

$$vSoKarHA = (vSoradhl + vSoradhr)/2 \qquad (2b).$$

To implement the differential lock function, the two filtered, Cardanic axle speeds vKarFVA and vKarFHA are used as controlled variables. To this end, the two Cardanic axle speeds vKarVA and vKarHA are calculated according to the following equation:

$$vKarVA = (vradvl + vradvr)/2 \qquad (3a); \text{ and}$$

$$vKarHA = (vradhl + vradhr)/2 \qquad (3b).$$

The two variables vKarVA and vKarHA are later referred to as the actual value for the Cardanic speed of the respective axle, as well. Filtered Cardanic axle speeds vKarFVA and vKarFHA are obtained by filtering variables vKarVA and vKarHA. The filter may be designed as a first order filter (PT1). The level of filtering is set by the corresponding filter parameters. As an alternative, the two unfiltered variables vKarVA and vKarHA can also be used in place of the filtered variables.

In addition, filtered differential axle speeds vDifFVA and vDifFHA are needed for each axle. The unfiltered differential speeds are initially calculated as follows:

$$vDifVA = vradvl - vradvr \qquad (4a); \text{ and}$$

$$vDifHA = vradhl - vrahhr \qquad (4b).$$

Filtered differential speeds vDifFVA and vDifFHA are obtained by filtering variables vDifVA and vDiffHA.

The various instances of filtering described above are each carried out, for example, using a suitably adjusted low pass filter.

The following is a description of FIG. 2, in which the calculation of deviations d_vKarLSVA for the front axle and d_vKarLSHA for the rear axle is represented. The two variables are later also referred to as deviation variables, which are determined as a function of the setpoint value and the actual value of the Cardanic speed.

At this point, the procedure of the present invention will be described once more: If the drive slip at both wheels of a drive axle is too high in comparison with the other drive axle, then a locking effect can be attained in the longitudinal direction by symmetrically generating a braking torque at the drive axle, at which the drive slip is too high. In this manner, a higher drive torque is applied to the other drive axle. For this purpose, the interaxle lock controller, and thus the calculation of system deviations as well, are organized by axle.

Therefore, the system-deviation determination represented in FIG. 2 is symmetric and includes two identical branches, one for the front axle and one for the rear axle. For this reason, only one branch, namely, the one for the rear axle, is described in detail below. The description of the front-axle branch is identical with regard to content.

It is noted at this point, that individual variables or blocks included in the front-axle branch are additionally marked with "v". Accordingly, the individual blocks or variables included in the rear-axle branch are marked with "h". Blocks having the same reference numeral, and variables having the same variable names, but a different subscript, have the same function or meaning.

Initially, the operating point to be set, i.e. setpoint value vSoKarLSHA at the rear axis, is ascertained for the interaxle lock controller. In addition, this value is later referred to as the setpoint value for the Cardanic speed.

To this end, the non-linearized value of setpoint Cardanic speed vSoKarHA, which is calculated according to equation (2b), is initially weighted by weighting factor K1 in Block 201*h*. The weighted setpoint Cardanic speed is supplied to a node 205*h*. Furthermore, the average value of the two free-rolling wheel speeds vradFreihl and vradFreihr is provided for the rear axis, using components 202*h* and 203*h*. To this end, the sum of the two free-rolling wheel speeds is initially formed by summation point 202*h*. In block 203*h*, the sum is then multiplied by the factor 0.5. The average value calculated in this manner is subsequently weighted by a factor (1−K1) in a block 204*h*. The weighted mean is likewise supplied to node 205*h*. The sum of the weighted setpoint Cardanic speed and the weighted mean is formed in this node. This sum vSoKarLSHA represents the setpoint value of the Cardanic speed at the rear axis.

Weighting factor K1 varies between the values 0 and 1, and is changed as a function of speed variable vf, which describes the vehicle speed. In the range of starting from rest, K1 is set equal to zero, since traction should have priority in this situation. K1 approaches the value 1 with increasing vehicle speed.

By changing the weighting factor, the operating point of the interaxle lock control can be lowered in comparison with the operating point of a possibly existing drive torque control system (AMR). This means that the interaxle lock already generates a locking torque before the drive torque control system can reduce the drive torque again.

The physical and technical background of weighting factor K1 shall be explained below, under the assumption that vDifFHA=0.

In the case of K1=1, d_vKarLSHA=vKarFHA—vSoKarHA. This corresponds exactly to the system deviation of the engine controller. That is, the engine controller and the interaxle lock adjust to the same setpoint variable vSoKarHA.

In the case of K1=0, d_vKarLSHA=vKarFHA—0.5 (vRadFreiHL+VradFreiHR). This means: As soon as the Cardanic speed of the rear axis is greater than the free-rolling wheel speeds, a deviation for the interaxle lock is formed as a function of the behavior of the front axle. In this case, a deviation can already exist for the interaxle lock, while, for the engine controller, there is still no deviation that results in a reduction of the engine torque.

The operating point vSoKarLSHA to be set is supplied to a node $206h$. This node is also fed actual Cardanic speed vKarHA, which was ascertained in accordance with equation (3b). In node $206h$, operating point vSoKarLSHA to be set, which, so to speak, represents the setpoint value, is subtracted from actual Cardanic speed vKarHA. The resulting difference represents the actual axle deviation. The setpoint value is subtracted from the actual value for the following reason: In the case in which driving wheels undergo wheelspin, the actual value is greater than the setpoint value. Consequently, this type of subtraction yields a positive value. This positive value can be directly processed within the framework of the pressure reduction to be carried out.

The difference generated in node $206h$ is fed to an additional node $207h$.

The value of the filtered differential speed vDifFHA formed using equation (4b) is weighted by the factor 0.5 in a block $211h$, and is subsequently weighted by a factor K2 in a block $212h$. The quantity ascertained in this manner is supplied to node $207h$. The subtraction taking place in node $207h$ provides the amount, by which the two wheels of the rear axle exceed setpoint value vSoKarLSHA. The factor 0.5 results from the definition of the Cardanic speed as the average value.

Factor K2 varies between 1 and 0. In the case of K2=1, the differential amount originating from differential speed vDifFHA is completely eliminated, which corresponds to the normal case. However, in the case of so-called "trampling wheels" on an axle, which corresponds to reciprocal oscillation of the wheel speeds at this axle, it is advantageous to add a corresponding portion of the difference of the wheel speeds to the deviation for the interaxle lock controller. This effectively damps the oscillations. Factor K2 is controlled by the vehicle speed. In the range of starting from rest, i.e. for a vehicle speed less than 2 m/s, Factor K2 is set to 0 in response to a vibrating axle. It is also conceivable to input it by way of a characteristic curve.

If the wheels on the rear axle are vibrating, then the rear axle is not running synchronously. The Cardanic speed at the rear axle is constant, despite the vibration of the rear wheels. In order to improve the implementation of the differential lock function, the differential speed caused by the oscillation is added within the framework of determining the system deviation.

The system deviation obtained using node $207h$ is limited to positive values by a block $208h$. The system deviation limited in this manner is fed to both a node $209h$ and a node $209v$. In node $209h$, the limited deviation of the front axle is subtracted from the limited deviation of the rear axle. This subtraction produces a coupling between the rear axle and the front axle, which allows adaption to the speeds of the two axles to each other. In other words, the deviation of the speeds between the two axles is ascertained. This deviation is converted, in order to control the electrical differential lock.

Forming the difference of the two system deviations ensures that the two Cardanic speeds are merely synchronized to each other, as is the case with a mechanical interaxle lock.

For the rear axle, the difference of the two deviations is subsequently limited by a block $210h$, and indeed, to the value of 0 in the downward direction, and to a maximum value d_vKarLSMax in the upward direction. Variable d_vKarLSHA at the output of block $210h$ represents the system deviation or the deviation variable for the rear axle, with regard to the interaxle lock controller. Variable d_vKarLSHA is a measure of to what degree the wheels of the rear axle are slipping, and, in this regard, to what extent there is a deviation with respect to the front axle.

As already mentioned above, the branch for the front axle is set up in an identical manner, which is why a separate description of this branch is not given. Rather, reference is made to the preceding description of the branch for the rear axle.

FIG. 3, in which the controller of the present invention is represented, is discussed in detail below.

As can be gathered from FIG. 3, a modified PI controller is used for each drive axle, in order to control the components of the interaxle lock torque. For this reason, the controller represented in FIG. 3 includes two identical PI controllers, one for the front axle and one for the rear axle. Only one branch, namely the one for the rear axle, is described in detail below. The description of the front-axle branch is identical with regard to content. Individual variables or blocks included in the rear-axle branch are additionally marked with "h". The equivalent is valid for the front axle. Blocks having the same reference numeral and variables having the same variable names, but a different subscript, have the same function or meaning.

System deviation d_vKarLSHA is fed to a block $301h$, in which it is multiplied by a parameter KpMBrSymKHA. The variable obtained in this manner is supplied to a block $305h$, in which it is limited to a maximum value MbrSymKarMax. The consequently obtained P component, which shall be denoted by MBrSymPHA, is fed to a node $308h$. The P component is used to improve the dynamic control response, since it increases the dynamic response of the interaxle lock controller. The limitation of the P component prevents torque surges that are too high.

Block $304h$ represents an integrator, which is used for generating the locking torque, that is, when system deviation d_vKarLSHA is greater than a parameter P_dvKarLSMin. A corresponding comparison takes place in integrator $304h$. This produces a dead zone, which can prevent overly responsive integration.

Integrator gain KoMBrSymIAufHA is determined as a function of the differentiated deviation variable, using a differentiator $302h$. To this end, KoMBrSymIAufHA is initially set equal to P_KoMBrSymIAuf1. If the differentiated deviation falls below value P_deldvKarLS, then KoMBrSymIAufHA is reduced to value P_KoMBrSymIAuf2.

The integration gain is calculated as a function of the differentiated deviation variable for the following reason: The evaluation of the differentiated deviation variable provides information about whether the deviation variable is increasing or decreasing. If one now determines that the system deviation shows a tendency to reverse, then the integration is slowed down by using the smaller value P__KoMBrSymIAuf2 in this case. This measure prevents an excess torque, which promotes "break-away" of the other axle.

If the deviation is less than parameter P__dvKarLSMin, then the I component is reduced in a controlled manner, using gradient KoMBrSymIAbHA. The I component of a drive axle is always reduced rapidly, when, for this axle, a wheelslip variable describing the prevailing wheelslip at the respective wheel, e.g. slradhl or slradhr, exceeds brake slip value P__s1Brems. Both cases represent a controlled reduction, but at a different gradient. A corresponding evaluation of the wheelslip takes place in a block 303$h$. The evaluation of the wheelslip considers sudden changes in the coefficient of friction that result in brake slip.

As one can see, a parameter of the integrator is switched over as a function of the derivative of system deviation d__vKarLSHA.

The engine speed is also monitored in the case of vehicles having a manual transmission. This takes place in block 303$h$, as well. If engine speed Nmot falls below a value P__nMotLSAbfast, then the I component is rapidly reduced as well, at gradient P__MbrSymIAbHAfast, which is fed to block 304$h$ by variable KoMBrSymIAbHA. Opening the interaxle lock prevents the engine from stalling. The value of variable P__nMotLSAbfast is ascertained beforehand, as a function of the engine torque characteristic, and is therefore dependent on the specific type of engine. This value may be in the range of 1200 to 1500 rpm.

At this point, it is to be emphasized that the build-up of the braking torque within the framework of the differential lock function is carried out in the form of closed-loop control. However, the reduction of the braking torque is carried out in the form of open-loop control. In order to control the build-up, or stated in more precise terms, the time characteristic of the build-up, variable KoMBrSymIAufHA is fed to block 304$h$. Accordingly, block 304$h$ is fed variable KoMBrSymIAbHA, in order to control the reduction. Variable MBrSymIHA' generated in block 304$h$ is fed to a node 306$h$. A possibly existing interaxle lock component stemming from the other axle, in this case the front axle, should also be considered. Therefore, node 306$h$ is fed variable MBrSymIVA calculated by block 307$v$. The difference of these two variables is formed in node 306$h$. Consequently, an interaxle lock component can only act at one axle in steady state. Nevertheless, control oscillations are eliminated, since dynamically short overlapping phases occur, which have an attenuating effect on the system. In the case of an all-wheel drive vehicle, this can lead to longitudinal vibrations between the front axle and the rear axle, since the inherent damping of the controlled system is small. The overlapping phases act to damp vibrations.

The I component obtained in this manner, with the aid of node 306$h$, is limited by block 307$h$. It is limited to the value 0 in the downward direction, and to a value MbrSymIMax in the upward direction.

Maximum value MbrSymIMax for the I component is determined by a series of variables: First of all, it is determined by the actuating mechanism reserves. That is, in the case of the brake hydraulics, a braking torque resulting from the maximum available circuit pressure may not be exceeded. Secondly, it is limited to a portion of the Cardanic drive torque that is momentarily available. In addition, it is limited as a function of the vehicle speed, i.e. the allowable interaxle lock torque decreases with increasing vehicle speed. No interaxle lock torque is allowed above a certain vehicle speed. Furthermore, MbrSymIMax can also be a function of the controller acting time, in this case, the acting time of a traction control system. A more intense interaxle lock action is rendered possible with increasing acting time. In this connection, reference is made, e.g. to an off-road start-up.

The limited I component is fed to node 308$h$. The two controller components, the P component and the I component, are added in this node. By adding the two controller components, one obtains interaxle lock torque component MBrSymLSHA for each axle. Variable MBrSymLSHA represents the setpoint value for the wheel torque to be adjusted. Since break actuators are used as actuating mechanisms in the exemplary embodiment, it is more precise to say that this variable is a setpoint value for a wheel-brake torque.

For the specific vehicle axle, calculated components MBrSymLSVA and MBrSymLSHA of the interaxle lock torque are divided up into equal portions among the respective wheels. In other words, a symmetric distribution takes place between the left and right wheels of an axle. Besides torque demands of other closed-loop control systems, a subordinate actuator system implementes, the corresponding wheel torques. The subordinate actuator system can be a braking system, by which active, i.e. driver-independent braking actions can be realized. In addition, it can be a controllable interaxle lock or a corresponding coupling.

Supplemental, special functions can be provided for the device and the method of the present invention. In this case, it may be a protective device that prevents the wheel brakes from being overloaded. In the case of this protective device, the estimated temperature of the brake disk is calculated, using a known brake temperature model. To this end, the power loss is calculated using the estimated wheel torques. The disk and temperature can be deduced, using a balance that covers the heating and cooling.

If a critical temperature value is exceeded at one or more wheel brakes, then either no new interaxle lock torque is generated, or an already existing interaxle lock torque is reduced. This relates to each axle, on which there is at least one overheated wheel brake.

As a final note, some important aspects are listed. The start-up behavior of a vehicle is improved by the implementation of the differential lock function, since a difference between the speed of the front axle and that of the rear axle is compensated for. I.e., the differential lock function is therefore implemented in the lower speed range. In other words: The implementation of the differential lock function represents an aid to starting from the rest. Let it also be said that the form of the exemplary embodiment selected in the specification, as well as the representation chosen in the figures, should have no limiting effect on the idea essential to the present invention. For example, the vehicle forming the basis of the exemplary embodiment has two drive axles. This should not represent a limitation. Of course, the method and device according to the present invention can also be used for vehicles that have more than two driven axles. A corresponding adaptation is performed in this case.

What is claimed is:

1. A method for implementing a differential lock function for a vehicle, comprising the steps of:

before an actual slippage of at least one driven wheel occurs, determining whether the at least one driven wheel has a tendency to experience a wheelslip in order to detect a presence of an incipient slippage of the at least one driven wheel;

implementing, in accordance with actions performed independently of a driver, a function of a differential lock in response to the incipient slippage of the at least one driven wheel, the function of the differential lock being implemented on at least one arrangement for controlling a wheel torque; and selecting at least one setpoint value for the wheel torque to be adjusted in order to perform actions executed independently of the driver.

2. The method according to claim 1, wherein:

the function of the differential lock acts between a front axle and a rear axle of the vehicle.

3. The method according to claim 1, wherein:

the vehicle includes an all-wheel drive, and the step of selecting allows existing velocities of driven vehicle axles to approach each other.

4. The method according to claim 1, wherein the at least one arrangement for controlling is one of:

a brake actuator assigned to a wheel of the vehicle and a part of a braking system that can generate braking torques at individual vehicle wheels, independently of the driver, a controllable, mechanical lock, and a controllable coupling.

5. The method according to claim 1, wherein:

the at least one setpoint value is a setpoint value for a wheel-brake torque.

6. The method according to claim 3, wherein:

the vehicle includes two driven axles, and respective ones of the at least one setpoint value are selected for the two driven axles.

7. The method according to claim 1, further comprising the steps of:

calculating a setpoint value for a Cardanic speed of an axle as a function of first wheel speed variables describing free-rolling wheel speeds, and as a function of a setpoint value for a drive slip;

calculating an actual value for the Cardanic speed of the same axle as a function of second wheel speed variables describing wheel speeds calculated by wheel speed sensors;

calculating a deviation variable as a function of the setpoint value for the Cardanic speed and the actual value for the Cardanic speed; and converting the deviation variable into the at least one setpoint value for the wheel torque to be adjusted in accordance with an operation of the at least one arrangement for controlling.

8. The method according to claim 7, wherein:

the at least one arrangement for controlling includes a PI controller.

9. The method according to claim 7, further comprising the step of:

selecting the setpoint value for the Cardanic speed such that the function of the differential lock is activated as a function of time, prior to controlling an engine torque, wherein:

in order to select the setpoint value for the Cardanic speed, the setpoint value for the Cardanic speed is calculated as a function of a speed variable corresponding to a vehicle speed.

10. The method according to claim 7, wherein:

effects in the second wheel speed variables originating from reciprocal oscillations of the wheel speeds at a respective axle are considered in the step of calculating the deviation variable.

11. The method according to claim 7, wherein:

the at least one arrangement for controlling includes a proportional component and an integral component, and an integrator gain for the integral component is calculated as a function of a value of the deviation variable.

12. The method according to claim 11, further comprising the step of:

quickly reducing the integral component when at least one wheelslip variable for a respective axle exceeds a preselected value.

13. A device for implementing a differential lock function for a vehicle, comprising:

an arrangement for controlling a wheel torque;

an arrangement for determining, before an actual slippage of at least one driven wheel occurs, whether the at least one driven wheel has a tendency to experience a wheelslip in order to detect a presence of an incipient slippage of the at least one driven wheel;

an arrangement for implementing, in accordance with actions performed independently of a driver, a function of a differential lock in response to the incipient slippage of the at least one driven wheel, the function of the differential lock being implemented on the arrangement for controlling the wheel torque; and an arrangement for selecting at least one setpoint value for the wheel torque to be adjusted in order to perform actions executed independently of the driver.

14. The device according to claim 13, wherein:

the function of the differential lock acts between a front axle and a rear axle of the vehicle.

15. The method according to claim 1, further comprising:

eliminating a geometric slip occurring at at least one wheel of the vehicle.

16. The method according to claim 15, wherein:

the eliminating of the geometric slip is performed as a function of a free-rolling wheel speed of the at least one wheel.

17. The device according to claim 13, further comprising:

an arrangement for eliminating a geometric slip occurring at at least one wheel of the vehicle.

18. The device according to claim 17, wherein:

the arrangement for eliminating the geometric slip eliminates the geometric slip as a function of a free-rolling wheel speed of the at least one wheel.

* * * * *